United States Patent
Minouchi

(10) Patent No.: US 8,110,620 B1
(45) Date of Patent: Feb. 7, 2012

(54) UNCURED RUBBER COMPOSITION, PROCESS FOR PRODUCING THE SAME, AND PNEUMATIC TIRE

(75) Inventor: Norio Minouchi, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 13/155,471

(22) Filed: Jun. 8, 2011

(30) Foreign Application Priority Data

Mar. 7, 2011 (JP) .................. 2011-049216

(51) Int. Cl.
*C08J 3/20* (2006.01)
(52) U.S. Cl. .................. 523/351; 524/495; 524/496
(58) Field of Classification Search .................. 523/351; 524/495, 496
See application file for complete search history.

(56) References Cited

U.S. PATENT DOCUMENTS

2003/0088006 A1    5/2003  Yanagisawa et al.
2006/0106149 A1    5/2006  Sandstrom et al.
2010/0144951 A1    6/2010  Yamada et al.

FOREIGN PATENT DOCUMENTS

| | | |
|---|---|---|
| EP | 1939014 | 7/2008 |
| EP | 2218749 | 8/2010 |
| JP | 2004099625 A | 4/2004 |
| JP | 2006213804 A | 8/2006 |
| JP | 2011016874 A | 1/2011 |

OTHER PUBLICATIONS

EP Search Report for Application No. 11168986.5 dated Jul. 22, 2011.

*Primary Examiner* — Edward Cain
(74) *Attorney, Agent, or Firm* — Fish & Richardson P.C.

(57) ABSTRACT

A process for producing an uncured rubber composition containing a rubber wet master batch obtained by using, as raw materials, at least a filler, a dispersing solvent, and a rubber latex liquid made mainly of a natural rubber latex, mainly comprising: a step (I) wherein at the time of dispersing the filler into the dispersing solvent, at least one portion of the rubber latex liquid is added thereto, thereby preparing a slurry containing the filler to which rubber latex particles adhere, a step (II) wherein the slurry is mixed with the rest of the rubber latex liquid, thereby preparing the rubber latex liquid containing the rubber-latex-particle-adhering filler.

42 Claims, No Drawings

UNCURED RUBBER COMPOSITION, PROCESS FOR PRODUCING THE SAME, AND PNEUMATIC TIRE

BACKGROUND OF THE INVENTION

Field of the Invention

The present invention relates to an uncured rubber composition containing a rubber wet master batch obtained by using, as raw materials, at least a filler, a dispersing solvent, and a rubber latex liquid made mainly of a natural rubber latex; a process for producing the composition; and a pneumatic tire.

Hitherto, it has been known in the rubber industry that when a rubber composition containing a filler such as carbon black is produced, a rubber wet master batch is used in order to improve the workability of the composition and the dispersibility of the filler. The rubber wet master batch is a material obtained by mixing a filler with a dispersing solvent at a predetermined ratio in advance, dispersing the filler in the dispersing solvent by mechanical force to prepare a filler-containing slurry, mixing the slurry and a rubber latex liquid with each other in a liquid phase state, adding a solidifying agent such as an acid to the mixture to solidify the mixture, and collecting and drying the mixture. In the case of using the rubber wet master batch, a rubber composition is obtained which is better in filler-dispersibility and rubber physical properties, such as workability and reinforcing performance, than in the case of using a rubber dry master batch obtained by mixing a filler and a rubber with each other in a solid phase state. The use of this rubber composition as a raw material makes it possible to produce a rubber product (such as pneumatic tire) that has, for example, a reduced rolling resistance and an excellent fatigue resistance.

PRECEDENT TECHNICAL DOCUMENTS

Patent Documents

As a process for producing a natural rubber wet master batch, Patent Document 1 discloses a process for producing a natural rubber wet master batch that includes the step of mixing a slurry in which a filler such as carbon black is previously dispersed in water with a natural rubber latex, wherein as to the particle size distribution of the filler in the slurry, the 90%-by-volume particle diameter (D90) thereof is adjusted to 30 μm or less. Patent Document 2 discloses a natural-rubber wet-master-batch rubber composition obtained by a producing process of mixing a slurry in which carbon black is previously dispersed in water with a natural rubber latex.
Patent document 1: JP-A-2004-99625
Patent document 2: JP-A-2006-213804

SUMMARY OF THE INVENTION

However, the present inventors have made eager investigations to find out that a cured rubber of the natural-rubber wet-master-batch rubber composition obtained by the producing process disclosed in each of the above-described patent documents has room for further improvement in exothermic property, strength and fatigue resistance. Additionally, the producing process described in each of the above-described patent documents has the step of mixing a slurry wherein carbon black is previously dispersed in water with a natural rubber latex. Thus, in a case where considerable time is required from the end of the preparation of the slurry to the mixing thereof with the natural rubber latex, the re-coagulation of the filler such as carbon black advances easily in the slurry. Furthermore, even after the natural rubber wet master batch is prepared, the re-coagulation of the filler advances easily. Thus, it has been found that the dispersion of the filler (such as carbon black) may locally become unfavorable in the finally-obtained rubber composition. When the re-coagulation of the filler advances in the slurry or in the natural rubber wet master batch so that the dispersion of the filler becomes locally unfavorable, the exothermic property, the strength and the fatigue resistance are lowered. Accordingly, under the actual circumferences, there remains room for further improvement in any process for producing a process for producing an uncured rubber composition containing a rubber wet master batch when physical properties of the finally-obtained cured rubber are taken into consideration.

In the meantime, in a solidifying step of mixing a filler-containing slurry with a natural rubber latex liquid in a liquid phase state, and then adding a solidifying agent, such as an acid, thereto, thereby solidifying the rubber latex liquid, it is general to nuclearize ammonia, which acts as a latex-stabilizing agent, in the natural rubber latex, with the solidifying agent to precipitate the ammonia as an ammonium salt, thereby solidifying the natural rubber latex. In the resultant natural rubber solidified product, the precipitated ammonium salt is contained; thus, it is necessary to wash the natural rubber solidified product repeatedly to remove the ammonium salt. If the washing is insufficient, there is caused a problem that the salt produces bad effects onto the bondability, the exothermic property and the reinforcing performance of a cured rubber obtained from a rubber composition (as a raw material) containing the natural rubber solidified product. Considering physical properties of the cured rubber, it is preferred to wash the natural rubber solidified product sufficiently. However, much time and labor are consumed by an excessive washing. This makes the productivity bad. Moreover, waste liquid after the washing contains strong acids; thus, when the liquid is discarded, it is feared that the liquid produces a bad effect on the environment.

SUMMARY OF THE INVENTION

The present invention has been made in light of the above-mentioned situation, and an object thereof is to provide an uncured rubber composition that contains a rubber wet master batch wherein a filler is evenly dispersed and the re-aggregation of the filler with time is restrained, and that turns a cured rubber excellent in exothermic property, durability and rubber strength; and to provide a process for producing the composition.

Another object of the present invention is to provide an uncured rubber composition wherein the content by percentage of any ammonium salt is reduced, and a process for producing the composition. Still another object thereof is to make a large improvement in the bondability, the exothermic property and the reinforcing performance of a cured rubber from the uncured rubber composition, and of a pneumatic tire therefrom.

The above object can be achieved by the present invention described below. That is, the first process for producing an uncured rubber composition containing a rubber wet master batch obtained by using, as raw materials, at least a filler, a dispersing solvent, and a rubber latex liquid made mainly of a natural rubber latex, comprising: a step (I) wherein at the time of dispersing the filler into the dispersing solvent, at least one portion of the rubber latex liquid is added thereto, thereby preparing a slurry containing the filler to which rubber latex particles adhere, a step (II) wherein the slurry is mixed with the rest of the rubber latex liquid, thereby preparing the rubber latex liquid containing the rubber-latex-particle-adhering filler, a step (III-a) wherein the rubber latex liquid containing the rubber-latex-particle-adhering filler is solidified and dried, thereby producing a rubber wet master batch, and a step (IV) wherein the rubber wet master batch is dry-mixed with a dry rubber made mainly of a natural rubber and/or a polyisoprene rubber.

According to the first producing process described above, in the step of producing a rubber wet master batch which is a raw material of an uncured rubber composition, at the time of dispersing a filler into a dispersing solvent, at least one portion of a rubber latex liquid is added thereto, thereby preparing a slurry containing the filler to which rubber latex particles adhere (step (I)). In this way, a very thin latex phase is formed on a part or the whole of the surface of the filler, and further at the time of mixing the slurry with the rest of the rubber latex liquid in the step (II), the re-aggregation of the filler can be prevented. Furthermore, also in the step of solidifying and drying the rubber latex liquid containing the rubber-latex-particle-adhering filler (III-(a)), the re-aggregation of the filler can be restrained. As a result, a rubber wet master batch can be yielded wherein the filler is evenly dispersed and the filler exhibits an excellent dispersion stability also over time.

In the above-mentioned rubber wet master batch producing step, the dispersibility of the filler in the slurry is better and the re-aggregation of the filler can be further prevented than in the case of producing a slurry only by dispersing a filler into a dispersing solvent. Thus, the first producing process produces an excellent advantageous effect that the storage stability of the slurry is also excellent.

The first producing process further has the step (IV), wherein the resultant rubber wet master batch is dry-mixed with a dry rubber made mainly of a natural rubber and/or a polyisoprene rubber. When the master batch undergoes this step (IV), an uncured rubber composition can be produced wherein a remarkable improvement is made in exothermic property and fatigue resistance. The cause thereof is unclear; however, the cause is presumed as follows: the Tg of the rubber component (natural rubber) in the rubber wet master batch yielded from the raw material, which is the rubber latex liquid made mainly of the natural rubber latex, is close to that of the dry rubber; thus, at the time of the dry-mixing, these easily become compatible with each other, so that the exothermic property and the fatigue resistance of the resultant uncured rubber composition are remarkably improved.

In the present invention, the "dry-mixing" means that at least two mixing components, for example, a rubber wet master batch and a dry rubber, are mixed with each other in the state that the water content by percentage in the whole of the mixing components is set to 5% or less. A specific example of a method for the dry-mixing is a method of performing the mixing by use of a kneading machine such as a Banbury mixer, an open roll, a co-kneader and the like.

In the first producing process, it is preferred that in the step (I), the 90% volume particle diameter (D90) of the rubber-latex-particle-adhering filler in the slurry is 31 μm or more. According to this manner, an excellent dispersibility of the filler can be obtained in the slurry and further the re-aggregation of the filler can be prevented. Thus, it is possible to make the storage stability of the slurry excellent and further produce an uncured rubber composition that can be finally give a cured rubber excellent in exothermic property, durability and rubber strength. In the present invention, the D90 of the filler to which the rubber latex particles adhere means a value obtained by making a measurement, considering the volume of not only the filler but also that of the adhering rubber latex particles.

In the first producing process, it is preferred that in the step (I), the ratio by mass of any solid (rubber) in the added rubber latex liquid is from 0.25 to 15% by mass of the filler, and it is also preferred that in the step (I), a concentration of the solid (rubber) in the added rubber latex liquid is from 0.2 to 5% by mass. According to this manner, in the step for producing the rubber wet master batch, which is a raw material of the uncured rubber composition, a rubber wet master batch is yielded wherein the dispersion degree of the filler is made high while the rubber latex particles are certainly caused to adhere to the filler.

In the first producing process, it is preferred that in the step (IV), the ratio of A/B is from 90/10 to 70/30 wherein A represents the total amount of any rubber component in the rubber wet master batch and B represents the total amount of any rubber component in the dry rubber. According to this manner, an uncured rubber composition can be produced wherein a further improvement is made in exothermic property and fatigue resistance.

In the first producing process, it is preferred that when the total amount of any rubber component in the uncured rubber composition in the step (IV) is regarded as 100 parts by mass, carbon black is further contained in an amount of 0 to 5 parts by mass. According to this manner, an uncured rubber composition can be produced wherein improvements are made with a good balance in exothermic property and in fatigue resistance.

The second process for producing an uncured rubber composition containing a rubber wet master batch obtained by using, as raw materials, at least a filler, a dispersing solvent, and a rubber latex liquid made mainly of a natural rubber latex, comprising: a step (I) wherein at the time of dispersing the filler into the dispersing solvent, at least one portion of the rubber latex liquid is added thereto, thereby preparing a slurry containing the filler to which rubber latex particles adhere, a step (II) wherein the slurry is mixed with the rest of the rubber latex liquid, thereby preparing the rubber latex liquid containing the rubber-latex-particle-adhering filler, a step (III-(b1)) wherein carbon dioxide is used as a solidifying agent to solidify the rubber latex containing the rubber-latex-particle-adhering filler, thereby producing a filler-containing rubber-latex-solidified product, and a step (III-(b2)) wherein the filler-containing rubber-latex-solidified product is solidified and dried, thereby removing any ammonium salt contained in the filler-containing rubber-latex-solidified product, so as to produce the rubber wet master batch.

According to the second producing process, in the step of producing a rubber wet master batch which is a raw material of an uncured rubber composition, at the time of dispersing a filler into a dispersing solvent, at least one portion of a rubber latex liquid is added thereto, thereby preparing a slurry containing the filler to which rubber latex particles adhere (step (I)). In this way, a very thin latex phase is formed on a part or the whole of the surface of the filler, and further at the time of mixing the slurry with the rest of the rubber latex liquid in the step (II), the re-aggregation of the filler can be prevented. Next, carbon dioxide is used as a solidifying agent to solidify the rubber latex liquid containing the rubber-latex-particle-adhering filler (step (III-(b1))). At this time, ammonia, which acts as a stabilizer for the natural rubber latex, reacts with carbon dioxide to produce ammonium salts, such as an ammonium-hydrogen carbonate, as byproducts in the filler-containing rubber-latex-solidified product. However, the resultant is heated to be solidified and dried (step (III-(b2)); by the heating, the ammonium salts contained in the filler-containing rubber-latex-solidified product are decomposed and vaporized. For this reason, while the filler-containing rubber-latex-solidified product is kept in an uncured state, the ammonium salts can be removed. This matter can result in the production of an uncured rubber composition that can be remarkably improved in exothermic property and fatigue resistance and that contains a rubber wet master batch wherein the ammonium salt content by percentage is decreased.

In the second producing process, it is preferred that in the step (I), the 90% volume particle diameter (D90) of the rubber-latex-particle-adhering filler in the slurry is 31 or more. According to this manner, an excellent dispersibility of the filler can be obtained in the slurry and further the re-aggregation of the filler can be prevented. Thus, it is possible to make the storage stability of the slurry excellent and further produce an uncured rubber composition that can be finally give a cured rubber excellent in exothermic property, durability and rubber strength. In the present invention, the D90 of the filler to which the rubber latex particles adhere means a value obtained by making a measurement, considering the volume of not only the filler but also that of the adhering rubber latex particles.

In the second producing process, it is preferred that in the step (I), the ratio by mass of any solid (rubber) in the added rubber latex liquid is from 0.25 to 15% by mass of the filler, and it is also preferred that in the step (I), a concentration of the solid (rubber) in the added rubber latex liquid is from 0.2 to 5% by mass. According to this manner, in the step for producing the rubber wet master batch, which is a raw material of the uncured rubber composition, a rubber wet master batch is yielded wherein the dispersion degree of the filler is made high while the rubber latex particles are certainly caused to adhere to the filler.

In the second producing process, it is preferred that as the solidifying agent, the following is used: at least one selected from the group consisting of carbon dioxide gas, carbon-dioxide-containing water, and dry ice. In the rubber wet master batch producing step, the use of the solidifying agent makes it possible to produce, certainly and simply, an uncured rubber composition containing a rubber wet master batch wherein the ammonium salt content by percentage is decreased.

The third process for producing an uncured rubber composition containing a rubber wet master batch obtained by using, as raw materials, at least a filler, a dispersing solvent, and a rubber latex liquid made mainly of a natural rubber latex, comprising: a step (I) wherein at the time of dispersing the filler into the dispersing solvent, at least one portion of the rubber latex liquid is added thereto, thereby preparing a slurry containing the filler to which rubber latex particles adhere, a step (II) wherein the slurry is mixed with the rest of the rubber latex liquid, thereby preparing the rubber latex liquid containing the rubber-latex-particle-adhering filler, and a step (III-(c)) wherein fine bubbles are added to the rubber latex liquid containing the rubber-latex-particle-adhering filler to remove ammonia contained in the rubber latex liquid containing the rubber-latex-particle-adhering filler, thereby solidifying and drying the rubber latex liquid containing the rubber-latex-particle-adhering filler to produce the rubber wet master batch.

According to the third producing process, in the step of producing a rubber wet master batch which is a raw material of an uncured rubber composition, at the time of dispersing a filler into a dispersing solvent, at least one portion of a rubber latex liquid is added thereto, thereby preparing a slurry containing the filler to which rubber latex particles adhere (step (I)). In this way, a very thin latex phase is formed on a part or the whole of the surface of the filler, and further at the time of mixing the slurry with the rest of the rubber latex liquid in the step (II), the re-aggregation of the filler can be prevented. Next, fine bubbles are added to the rubber latex liquid containing the rubber-latex-particle-adhering filler to remove ammonia contained in the rubber latex liquid containing the rubber-latex-particle-adhering filler, and simultaneously solidify the latex (III-(c)). In this step (III-(c)), the contact area of the fine bubbles with the ammonia present as the stabilizer in the rubber latex liquid is increased not only by an impact wave based on a phenomenon that the fine bubbles, which are added in the rubber latex liquid containing the rubber-latex-particle-adhering filler, collapse (cavitation phenomenon) but also by an increase in the gas concentration based on a matter that the fine bubbles are filled at a high degree into the rubber latex liquid containing the rubber-latex-particle-adhering filler. As a result, the ammonia is vaporized and removed. In this way, the ammonia, which acts as the stabilizer for the rubber latex liquid, can be removed without using any solidifying agent made of a strong acid such as formic acid or sulfuric acid, or a salt such as aluminum chloride. Thus, the rubber latex liquid containing the rubber-latex-particle-adhering filler can be solidified. As a result, a rubber wet master batch can be produced wherein ammonium salts, which cause a trouble in any conventional method using a solidifying agent, hardly remain. According to this rubber wet master batch producing step, any ammonium salt is hardly generated in the step of solidifying the rubber latex liquid containing the rubber-latex-particle-adhering filler; thus, the step of washing the rubber wet master batch, which is required in the conventional solidifying-agent-used method, becomes unnecessary.

In the third producing process, it is preferred that in the step (I), the 90% volume particle diameter (D90) of the rubber-latex-particle-adhering filler in the slurry is 31 μm or more. According to this manner, an excellent dispersibility of the filler can be obtained in the slurry and further the re-aggregation of the filler can be prevented. Thus, it is possible to make the storage stability of the slurry excellent and further produce an uncured rubber composition that can be finally give a cured rubber excellent in exothermic property, durability and rubber strength. In the present invention, the D90 of the filler to which the rubber latex particles adhere means a value obtained by making a measurement, considering the volume of not only the filler but also that of the adhering rubber latex particles.

In the third producing process, it is preferred that in the step (I), the ratio by mass of any solid (rubber) in the added rubber latex liquid is from 0.25 to 15% by mass of the filler, and it is also preferred that in the step (I), a concentration of the solid (rubber) in the added rubber latex liquid is from 0.2 to 5% by mass. According to this manner, in the step for producing the rubber wet master batch, which is a raw material of the uncured rubber composition, a rubber wet master batch is yielded wherein the dispersion degree of the filler is made high while the rubber latex particles are certainly caused to adhere to the filler.

In the third producing process, it is preferred that the average bubble diameter of the fine bubbles is 100 μm or less, that the average number of the fine bubbles is 50000 per milliliter or more, and that the fine bubbles are fine bubbles comprising a gas made mainly of air or carbon dioxide. According to this manner, the rubber-wet-master-batch-containing uncured rubber composition can be more easily produced with a higher certainty.

In the first to third producing process, it is preferred that the step (I) is a step wherein the portion of the rubber latex liquid is beforehand mixed with the dispersing solvent, and subsequently the filler is added to the mixture to disperse the filler therein, thereby preparing the slurry containing the rubber-latex-particle-adhering filler. According to the first to third producing processes, in the step (I), the rubber latex particles adhere more evenly to the filler with a higher certainty. In this way, in the step of producing the rubber wet master batch, which is a raw material of the uncured rubber composition, a rubber wet master batch is yielded wherein the rubber latex particles adhere certainly to the filler and further the dispersion degree of the filler is made higher.

In the first to third producing process, it is preferred that the rubber wet master batch obtained after the step (III-(a)), (III-(b)) or (III-(c)) contains the filler in an amount of 40 to 80 parts by mass for 100 parts by mass, of the rubber. In this case, in the step of producing the rubber wet master batch, which is a raw material of the uncured rubber composition, a rubber wet master batch is yielded wherein improvements are made with a good balance in the dispersion degree of the filler, and in the exothermic property, fatigue resistance and rubber strength of a cured rubber made from this master batch.

In the first to third producing process, it is preferred that the filler is carbon black, and that the rubber latex liquid is a natural rubber latex liquid. In these cases, an uncured rubber composition can be produced wherein the dispersion degree of the filler is made high with a higher certainty, and further a further improvement is made in the exothermic property, fatigue resistance and rubber strength of a cured rubber made from this master batch.

The uncured rubber composition according to the present invention is a composition produced by any one of the first to third producing processes. This uncured rubber composition is a composition wherein the filler is evenly dispersed and the dispersion stability of the filler is excellent over time. Thus, the composition can be a raw material of a cured rubber excellent in exothermic property, durability and rubber strength.

The uncured rubber composition preferably contains the filler in an amount of 40 to 80 parts by mass for 100 parts by mass of the rubber. This uncured rubber composition is a composition wherein improvements are made with a good balance in the dispersion degree of the filler and in the exothermic property, durability and rubber strength of a cured rubber made from this composition.

DETAILED DESCRIPTION OF THE PREFERRED EMBODIMENTS

The first, uncured rubber composition producing process according to the present invention is a process for producing an uncured rubber composition containing a rubber wet master batch obtained by using, as raw materials, at least a filler, a dispersing solvent, and a rubber latex liquid made mainly of a natural rubber latex, comprising a step (I) wherein at the time of dispersing the filler into the dispersing solvent, at least one portion of the rubber latex liquid is added thereto, thereby preparing a slurry containing the filler to which rubber latex particles adhere, a step (II) wherein the slurry is mixed with the rest of the rubber latex liquid, thereby preparing the rubber latex liquid containing the rubber-latex-particle-adhering filler, a step (III-a) wherein the rubber latex liquid containing the rubber-latex-particle-adhering filler is solidified and dried, thereby producing a rubber wet master batch, and a step (IV) wherein the rubber wet master batch is dry-mixed with a dry rubber made mainly of a natural rubber and/or a polyisoprene rubber.

In the present invention, the filler means an inorganic filler used ordinarily in the rubber industry, example thereof including carbon black, silica, clay, talc, calcium carbonate, magnesium carbonate and aluminum hydroxide. Of these inorganic fillers, carbon black can be in particular preferably used in the present invention.

Examples of the species of the carbon black include carbon black species used in an ordinary rubber industry, such as SAF, ISAF, HAF, FEF, and GPF; and electroconductive carbon black species such as acetylene black and Ketjenblack. The carbon black may be granulated carbon black, which is granulated in an ordinary rubber industry, considering the handleability thereof, or may be non-granulated carbon black.

The dispersing solvent is in particular preferably water, and may be, for example, water containing an organic solvent.

The rubber latex liquid may be a natural rubber latex liquid, or a synthetic rubber latex liquid.

The natural rubber latex liquid is a natural product produced by the metabolic effect of a plant, and is in particular preferably a natural-rubber/water system latex liquid, wherein water is a dispersing solvent. The number-average molecular weight of the natural rubber in the natural rubber latex liquid used in the present invention is preferably 2000000 or more, more preferably 2500000 or more. The synthetic rubber latex liquid is, for example, a styrene-butadiene rubber, butadiene rubber, nitrile rubber or chloroprene rubber produced by emulsion polymerization.

Hereinafter, a specific description is made about the first, uncured rubber composition producing process according to the present invention, in particular, an example thereof in which the filler and the rubber latex liquid are carbon black and a natural rubber latex liquid, respectively. In this case, an uncured rubber composition can be produced which contains a rubber wet master batch about which the dispersion degree of the carbon black is very high and a further improvement is made in the exothermic property, durability and rubber strength of a cured rubber produced from the master batch. The natural rubber latex liquid may be selected from concentrated latex, fresh latex called field latex, and others without any discrimination.

(1) Step (I)

In the step (I), at the time of dispersing carbon black into a dispersing solvent, at least one portion of a natural rubber latex liquid is added thereto, thereby preparing a slurry containing the carbon black to which natural rubber latex particles adhere. The natural rubber latex liquid may be previously mixed with the dispersing solvent, and subsequently the carbon black may be added to the mixture to disperse the carbon black therein. The carbon black may also be added to the dispersing solvent, and then while the natural rubber latex liquid is added thereto at a predetermined addition rate, the carbon black may be dispersed in the dispersing solvent. Alternatively, the carbon black may be added to the dispersing solvent, and then while the natural rubber latex liquid is added thereto by operation divided in several parts which each give a constant amount of the liquid, the carbon black may be dispersed in the dispersing solvent. By dispersing the carbon black into the dispersing solvent in the state that the natural rubber latex liquid is present therein, a slurry can be prepared which contains the carbon black to which natural rubber latex particles adhere. In the step (I), the addition amount of the natural rubber latex liquid is, for example, from 0.075 to 12% by mass of the total of the used natural rubber latex liquid (the total of the latex liquid portions added in the step (I) and the step (II)).

In the step (I), the ratio by mass of a solid (rubber) in the added natural rubber latex liquid is preferably from 0.25 to 15% by mass of the carbon black, more preferably from 0.5 to 6% by mass thereof. The concentration of the solid (rubber) in the added rubber latex liquid is preferably from 0.2 to 5% by mass, more preferably from 0.25 to 1.5% by mass. In these cases, a rubber wet master batch can be produced wherein the dispersion degree of the carbon black is made high while the natural rubber latex particles are caused to adhere reliably to the carbon black.

A method for mixing the carbon black with the dispersing solvent in the presence of the natural rubber latex liquid in the step (I) may be a method of using an ordinary dispersing machine, such as a high-shear mixer, a homo-mixer, a ball mill, a bead mill, a high-pressure homogenizer, an ultrasonic homogenizer or a colloid mill, to disperse the carbon black.

The "high-shear mixer" is a mixer having a rotor rotatable at a high speed and a fixed stator wherein the rotor is rotated in the state that a precise clearance is set between the rotor and stator, whereby a high-shear effect acts. In order to generate the high-shear effect, it is preferred to set the clearance between the rotor and the stator to 0.8 mm or less, and set the peripheral speed of the rotor to 5 m/s or more. The high-shear mixer may be a commercially available product, and is, for example, a "HIGH SHEAR MIXER" manufactured by Silverson.

In the present invention, when mixing the carbon black with the dispersing solvent in the presence of the natural rubber latex liquid, thereby preparing the slurry containing the natural-rubber-latex-particle-adhering carbon black, a surfactant may be added thereto in order to improve the dispersibility of the carbon black. The surfactant may be a surfactant known in the rubber industry, and examples thereof include nonionic surfactants, anionic surfactants, cationic surfactants, and amphoteric surfactants. In place of the surfactant or in addition thereto, an alcohol such as ethanol may be used. When the surfactant is used, it is feared that rubber properties of a finally-obtained cured rubber are lowered. Thus, the blend amount of the surfactant is preferably 2, parts or less by mass, more preferably 1 part or less by mass for 100 parts by mass of the solid (rubber) in the natural rubber latex liquid. Even more preferably, the surfactant should not be substantially used.

In the slurry prepared in the step (I), as to the carbon black to which the natural rubber latex particles adhere, the 90% volume particle diameter D90 (µm) is preferably 31 µm or more, more preferably 35 µm or more. In this case, the dispersibility of the carbon black is excellent in the slurry, and further the re-coagulation of the carbon black can be prevented. Thus, the storage stability of the slurry is excellent, and further the exothermic property, durability and rubber strength of a cured rubber finally obtained therefrom are also excellent.

(2) Step (II)

In the step (II), the slurry is mixed with the rest of the natural rubber latex liquid, thereby preparing the rubber latex liquid containing the natural-rubber-latex-particle-adhering carbon black. The method for mixing the slurry with the rest of the natural rubber latex liquid in a liquid phase state is not particularly limited, and may be a method of using an ordinary dispersing machine, such as a high-shear mixer, a homo-mixer, a ball mill, a bead mill, a high-pressure homogenizer, an ultrasonic homogenizer or a colloid mill, to mix the slurry with the rest of the natural rubber latex liquid. At the time of the mixing, the whole of the mixing system including the dispersing machine and the like may be optionally heated.

The rest of the natural rubber latex liquid preferably has a higher solid (rubber) concentration than the natural rubber latex liquid added in the step (I) when the drying period/labor in the next step (III-(a)) is taken into consideration. Specifically, the solid (rubber) concentration is preferably from 10 to 60% by mass, more preferably from 20 to 30% by mass.

(3) Step (III-(a))

In the step (III-(a)), the rubber latex liquid containing the natural-rubber-latex-particle-adhering carbon black is solidified and dried. The solidifying and drying method may be a solidifying and drying method of incorporating a solidifying agent into the rubber latex liquid containing the natural-rubber-latex-particle-adhering carbon black so as to solidify the latex, and then drying the solidified latex, or may be a drying and caking method of drying the latex without solidifying the latex.

The solidifying agent used in the solidifying and drying method may be a solidifying agent used ordinarily to solidify a rubber latex liquid, and examples thereof include acids such as formic acid and sulfuric acid, and salts such as sodium chloride.

The method for drying the carbon-black-containing natural rubber latex liquid may be a method of using any one of various drying machines such as an oven, a vacuum drier, and an air drier.

In the present invention, a coagulant may be incorporated into the rubber latex liquid containing the natural-rubber-latex-particle-adhering carbon black (this liquid being obtained by mixing the slurry containing the natural-rubber-latex-particle-adhering carbon black with the natural rubber latex liquid in a liquid phase state), and the resultant coagulation may be collected and dried. The coagulant may be any coagulant known as a coagulant for rubber latex liquid. A specific example thereof is a cationic coagulant.

The rubber wet master batch obtained after the step (III-(a)) preferably contains the filler in an amount of 40 to 80 parts by mass for 100 parts by mass of the rubber. In this case, the obtained rubber wet master batch can be a master batch in which an improvement is made in the dispersion degree of the filler and in the exothermic property and durability of a cured rubber produced therefrom while the balance therebetween is satisfactorily kept.

In the rubber wet master batch obtained after the step (III-(a)), the contained carbon black is uniformly dispersed, so that the master batch is excellent in the dispersion stability of the carbon black over a long time.

(4) Step (IV)

In the step (IV), the natural rubber wet master batch and a dry rubber are dry-mixed with each other in the state that the components are heated to a temperature of 40 to 160° C. as the need arises. In the step (IV), it is preferred that the ratio of A/B is from 90/10 to 70/30 wherein A represents the total amount of any rubber component in the natural rubber wet master batch and B represents the total amount of any rubber component in the dry rubber. It is also preferred that when the total amount of any rubber component in the rubber composition is regarded as 100 parts by mass, carbon black is further contained in an amount of 0 to 5 parts by mass.

In the step (IV), at the time of the dry-mixing of the natural rubber wet master batch and the dry rubber, one or more blending agents used ordinarily in the rubbery industry may be optionally incorporated thereinto, examples of the agent(s) including a sulfur-based curing agent, a curing accelerator, silica, a silane coupling agent, zinc oxide, stearic acid, a curing acceleration aid, a curing retarder, an organic peroxide, an anti-ageing agent, a softening agent such as wax or oil, and a processing aid.

It is sufficient that the species of sulfur in the sulfur-based curing agent is any ordinary sulfur species for rubber, and examples thereof include powdery sulfur, precipitated sulfur, insoluble sulfur, and high-dispersible sulfur. The sulfur content in the rubber composition according to the present invention for a tire is preferably from 0.3 to 6 parts by mass for 100 parts by mass of the rubber component. If the sulfur content is less than 0.3 parts by mass, the crosslinkage density of the cured rubber is insufficient so that the rubber strength and the like are lowered. If the sulfur content is more than 6.5 parts by mass, in particular, both of the heat resistance and the durability deteriorate. In order to keep the rubber strength of the cured rubber good and to improve the heat resistance and the durability, the sulfur content is more preferably from 1.5 to 5.5 parts by mass, even more preferably from 2 to 4.5 parts by mass for 100 parts by mass of the rubber component.

The curing accelerator may be a curing accelerator used ordinarily for rubber curing. Examples thereof include sulfenamide based, thiuram based, thiazole based, thiourea based, guanidine based, and dithiocarbamate based curing accelerators. Such curing accelerators may be used alone or in the form of an appropriate mixture. The curing accelerator content is preferably from 1 to 5 parts by mass, more preferably from 1.5 to 4 parts by mass for 100 parts of the rubber component.

The anti-aging agent may be an anti-aging agent ordinarily used for rubber. Examples thereof include aromatic amine based, amine-ketone based, monophenol based, bisphenol based, polyphenol based, dithiocarbamate based, and thiourea based anti-aging agents. Such anti-aging agents may be used alone or in an appropriate mixture. The anti-aging agent content is preferably from 1 to 5 parts by mass, more preferably from 2 to 4.5 parts by mass for 100 parts by mass of the rubber component.

As described above, about the rubber wet master batch produced after the step (III-(a)), the contained filler is evenly dispersed and the dispersion stability of the filler over time is excellent. Thus, also about an uncured rubber composition produced by use of this master batch, the contained filler is evenly dispersed and the dispersion stability of the filler over time is excellent. In particular, a pneumatic tire produced by use of this uncured rubber composition, specifically, a pneumatic tire wherein the rubber composition according to the present invention is used for a tread rubber, a side rubber, a ply or belt coating rubber, or a bead filler rubber has a rubber region where the filler is satisfactorily dispersed; therefore, the tire gives, for example, a lowered rolling resistance, and very good exothermic property, durability and rubber strength.

The following describes the second process according to the present invention for producing an uncured rubber composition. The second producing process is a process for producing an uncured rubber composition containing a rubber wet master batch obtained by using, as raw materials, at least a filler, a dispersing solvent, and a rubber latex liquid made mainly of a natural rubber latex, comprising a step (I) wherein at the time of dispersing the filler into the dispersing solvent, at least one portion of the rubber latex liquid is added thereto, thereby preparing a slurry containing the filler to which rubber latex particles adhere, a step (II) wherein the slurry is mixed with the rest of the rubber latex liquid, thereby preparing the rubber latex liquid containing the rubber-latex-particle-adhering filler, a step (III-(b1)) wherein carbon dioxide is used as a solidifying agent to solidify the rubber latex containing the rubber-latex-particle-adhering filler, thereby producing a filler-containing rubber-latex-solidified product, and a step (III-(b2)) wherein the filler-containing rubber-latex-solidified product is solidified and dried, thereby removing any ammonium salt contained in the filler-containing rubber-latex-solidified product, so as to produce the rubber wet master batch. In the second producing process, the steps (I) and (II) are the same as in the first producing process.

(5) Step (III-(b1))

In the step (III-(b1)), carbon dioxide is used as a solidifying agent. Examples of the species of carbon dioxide which is, in particular, easily available and can easily be handled include carbon dioxide gas, carbon-dioxide-containing water, and dry ice. In order to solidify the rubber latex liquid containing the rubber-latex-particle-adhering filler certainly, the following is preferably performed: about carbon dioxide gas, a volume (at 27° C. and 1 atmosphere) of 8 L or more is used per liter of the rubber latex liquid in which the content by percentage of any solid (rubber component) is 60% by mass; about carbon-dioxide-containing water, a volume of 1 L or more is used per liter thereof when the water has a gas volume ($CO_2GV$) of 2.0 or more; and about dry ice, a weight of 15 g or more is used per liter thereof. The upper limit of the use amount of each of carbon dioxide gas, carbon-dioxide-containing water, and dry ice is not particularly limited. In the present invention, the wording "gas volume ($CO_2GV$)" denotes the ratio of the carbon dioxide gas volume generated when carbon dioxide gas is completely removed from a predetermined volume of a target water to the predetermined volume. For example, a 2.8 gas volume means that 2.8 L of carbon dioxide gas is contained in 1 L of a water.

The method for adding carbon dioxide as the solidifying agent to the rubber latex liquid containing the rubber-latex-particle-adhering filler, and solidifying the liquid while mixing the liquid with the agent is not particularly limited. The method may be a method using a mixing machine having stirring vanes of a propeller type or some other type that mainly gives thrust to the mixed liquid; or a method using a mixing machine having crushing vanes that mainly give shear force, such as a chopper composed of blades. The method may be a method of performing the mixing by use of an ordinary dispersing machine, such as a high-shear mixer, a homo-mixer, a ball mill, a bead mill, a high-pressure homogenizer, an ultrasonic homogenizer or a colloid mill. At the mixing time, the temperature of the whole of the mixing machine or some other mixing system may be adjusted into the range of 10 to 100° C. as the need arises.

(6) Step (III-(b2))

In the step (III-(b2)), the latex liquid containing the filler-containing rubber-latex-solidified product yielded in the step (III-(b1)) is solidified and dried, thereby removing ammonium salts contained in the filler-containing rubber-latex-solidified product to produce a rubber wet master batch. The method for the dehydration may be a method of separating, from the latex liquid containing the filler-containing rubber-latex-solidified product, the filler-containing rubber-latex-solidified product and the water in a known manner using a mesh, a centrifuge or some other. The method for the drying may be a method of heating the filler-containing rubber-latex-solidified product while stirring the product mechanically as the need arises. At the drying time, the heating temperature is preferably a temperature making it possible to decrease the water content by percentage sufficiently while the filler-containing rubber-latex-solidified product is kept in an uncured state. The preferred temperature is specifically from 100 to 150° C. By the heating at the drying time, ammoniumhydrogen carbonate (decomposition temperature: 58° C.) and other ammonium salts that are contained in the filler-containing rubber-latex-solidified product are decomposed and vaporized. In this way, a rubber wet master batch can be produced. It is preferred to set the water content by percentage in the rubber wet master batch after the drying to 1.5% or less.

In the rubber wet master batch yielded in the rubber wet master batch producing step, the amount of the ammonium salts is decreased. Specifically, the amount of the ammonium salts is decreased into 0.4% or less by mass of all the components of the rubber wet master batch other than the filler, preferably into 0.2% or less by mass thereof, more preferably into 0.1% or less by mass thereof. Accordingly, an uncured rubber composition containing this rubber wet master batch is useful as a raw material of a pneumatic tire, for which bondability, exothermic property and reinforcing performance are required, in particular, a raw material of a topping rubber for a steel tire.

One or more blending agents used ordinarily in the rubber industry may be optionally incorporated into the rubber wet master batch yielded after the step (III-(b2)), thereby producing the uncured rubber composition according to the present invention. Examples of the blending agent(s) include a sulfur-based curing agent, a curing accelerator, silica, a silane coupling agent, zinc oxide, stearic acid, a curing acceleration aid, a curing retarder, an organic peroxide, an anti-ageing agent, a softening agent such as wax or oil, and a processing aid. Usable examples of the sulfur-based curing agent, the curing accelerator and anti-ageing agent, the blend amount of each of the agents, and other matters related to the agents are the same as in the first producing process.

The method for blending the above-mentioned individual components with each other is not particularly limited, and may be any one selected from a method of kneading, in advance, the blending components other than the curing type components (such as the sulfur-based curing agent and the curing accelerator) to prepare a master batch, adding the other components thereto, and further kneading the resultant mixture; a method of adding the individual components to a mixing machine in any order, and kneading the mixture; a method of adding all the components thereto at the same time, and kneading the mixture; and other methods. After the step (III-(b2)), the step (IV) in the first producing process may be performed as the need arises.

The following describes the third process according to the present invention for producing an uncured rubber composition. The third producing process is a process for producing an uncured rubber composition containing a rubber wet master batch obtained by using, as raw materials, at least a filler, a dispersing solvent, and a rubber latex liquid made mainly of a natural rubber latex, comprising a step (I) wherein at the time of dispersing the filler into the dispersing solvent, at least one portion of the rubber latex liquid is added thereto, thereby preparing a slurry containing the filler to which rubber latex particles adhere, a step (II) wherein the slurry is mixed with the rest of the rubber latex liquid, thereby preparing the rubber latex liquid containing the rubber-latex-particle-adhering filler, and a step (III-(c)) wherein fine bubbles are added to the rubber latex liquid containing the rubber-latex-particle-adhering filler to remove ammonia contained in the rubber latex liquid containing the rubber-latex-particle-adhering filler, thereby solidifying and drying the rubber latex liquid containing the rubber-latex-particle-adhering filler to produce the rubber wet master batch. In the third producing process, the steps (I) and (II) are the same as in the first producing process.

(7) Step (III-(c))

In the step (III-(c)), fine bubbles are added to the rubber latex liquid containing the rubber-latex-particle-adhering filler. Examples of the gas which constitutes the fine bubbles include air, carbon dioxide, nitrogen, argon, helium and the like. These may be used alone or in the form of a mixture of two or more thereof. Of these gases, air or carbon dioxide is preferred since the use thereof makes it possible to produce the filler-containing rubber-latex-solidified product more easily with a higher certainty.

The method for adding the fine bubbles to the rubber latex liquid containing the rubber-latex-particle-adhering filler may be a method known by those skilled in the art. The method is, for example, a method of stirring the rubber latex liquid containing the rubber-latex-particle-adhering filler mechanically to generate whirls in the liquid, thereby generating (adding) the fine bubbles, or a method of adding the fine bubbles in a swirling flow way of sending water into a circumferential direction to generate a swirl flow, and using a matter that the swirl center of the flow turns into a negative pressure, whereby the water itself absorbs air to tear the gas phase, in a static mixer way of leading two flows of gas and liquid spirally in a tube by means of guide vanes, and breaking the flows by mushroom-shaped projections fixed to the inside of the tube, in an ejector way of making gas and liquid that coexist into a turbulent flow, and shearing the gas to separate the gas into bubbles, in a Venturi way of causing gas and liquid to flow simultaneously into a throttle region to generate impact waves by an abrupt change in the flow rate of the liquid, and breaking large bubbles by the generated impact waves, in a pressuring dissolution way of dissolving gas once into pressured water, and then reducing the pressure abruptly to generate bubbles, in a fine pore way of sending compressed air through fine pores into liquid, in a rotary way of rotating a rotor in a stator arranged around the rotor at a high speed, whereby the latex liquid itself absorbs gas to generate bubbles in the liquid, in an ultrasonic way of vibrating bubbles to separate water molecules, thereby generating fine cavities to generate bubbles, in a vapor pressuring way of blowing a mixed vapor of nitrogen and water vapor through a nozzle into the latex liquid, whereby the water vapor is condensed and the nitrogen, which is not condensed, generates bubbles, or in an electrolytic way of subjecting water to electrolysis, thereby generating fine bubbles of oxygen and hydrogen.

In order to add the fine bubbles into the rubber latex liquid containing the rubber-latex-particle-adhering filler, a commercially available fine bubble generator can be preferably used. Specific examples of the fine bubble generator include a micro-bubble generator, model MBG20ND07Z-1HH000, manufactured by Nikuni Corp., a generator, Pilot Plant series model 9000, manufactured by Root Co., a generator, model YJ-07, manufactured by Bi-clean Co., and a generator, type 1, 3, manufactured by Aura Tec Corp. In the present invention, it is preferred to produce a circulating plant containing any one of these devices, and then generate (add) fine bubbles by effect of the device while the rubber latex liquid containing the rubber-latex-particle-adhering filler is circulated at a rate of, for example, about 40 L/min.

In order to solidify certainly the rubber latex liquid containing the rubber-latex-particle-adhering filler, and further improve the bondability, exothermic property, and reinforcing performance of a cured rubber made from an uncured rubber composition containing the resultant rubber wet master batch, the average bubble diameter of the fine bubbles added to this latex liquid is preferably 100 μm or less, more preferably 50 μm or less, even more preferably 20 μm or less. As the average bubble diameter of the fine bubbles is smaller, the rubber latex liquid can be solidified with a higher certainty and additionally the cured rubber made from the uncured rubber composition containing the resultant rubber wet master batch is further improved in bondability, exothermic property, and reinforcing performance. Thus, the lower limit of the average bubble diameter of the fine bubbles is not particularly limited.

In addition, in order to solidify certainly the rubber latex liquid containing the rubber-latex-particle-adhering filler, and further improve the bondability, exothermic property, and reinforcing performance of the cured rubber made from the uncured rubber composition containing the resultant rubber wet master batch, the average number of the fine bubbles added to this latex liquid is preferably 50000 or more per milliliter, more preferably 70000 or more per milliliter, even more preferably 100000 or more per milliliter. As the average number of the fine bubbles is larger, the rubber latex liquid can be solidified with a higher certainty and additionally the cured rubber made from the uncured rubber composition containing the resultant rubber wet master batch is further improved in bondability, exothermic property, and reinforcing performance. Thus, the upper limit of the average number of the fine bubbles is not particularly limited.

The method for calculating out the average bubble diameter or the average number of the fine bubbles is, for example, a method of taking a photographic image of the fine bubbles at a predetermined power (for example, 10-power to 1000-power), and then subjecting the image to image processing to calculate out the average bubble diameter of fine bubbles per predetermined area, out of the fine bubbles in the image, or the average number converted from the number per predetermined area.

In order to solidify certainly the rubber latex liquid containing the rubber-latex-particle-adhering filler, it is preferred to use the fine bubbles in a volume (at 27° C. and 1 atmosphere) of 25 L or more per liter of the rubber latex liquid in which the content by percentage of any solid (rubber component) is 60% by mass. As the use amount of the fine bubbles is larger, the rubber latex liquid can be solidified with a higher certainty and additionally the cured rubber made from the uncured rubber composition containing the resultant rubber wet master batch is further improved in bondability, exothermic property, and reinforcing performance. Thus, the upper limit of the use amount of the fine bubbles is not particularly limited.

In the third producing process according to the present invention, it is allowable that while the fine bubbles are added to the rubber latex liquid containing the rubber-latex-particle-adhering filler, this latex liquid is optionally stirred. The method for the stirring is not particularly limited. The method may be a method using a stirring machine having stirring vanes of a propeller type or some other type that mainly gives thrust to the mixed liquid; or a method using a stirring machine having crushing vanes that mainly give shear force, such as a chopper composed of blades. The method may be a method of performing the stirring by use of an ordinary dispersing machine, such as a high-shear mixer, a homo-mixer, a ball mill, a bead mill, a high-pressure homogenizer, an ultrasonic homogenizer or a colloid mill. At the stirring time, the temperature of the whole of the dispersing machine or some other stirring system may be adjusted into the range of 10 to 100° C. as the need arises.

After the solidifying step, the filler-containing rubber-latex-solidified product is optionally solidified and dried to produce a rubber wet master batch. The method for the dehydration may be a method of separating, from the latex liquid containing the filler-containing rubber-latex-solidified product, the filler-containing rubber-latex-solidified product and the water in a known manner using a mesh, a centrifuge or some other. The method for the drying may be a method of heating the filler-containing rubber-latex-solidified product while stirring the product mechanically as the need arises. At the drying time, the heating temperature is preferably a temperature making it possible to decrease the water content by percentage sufficiently while the filler-containing rubber-latex-solidified product is kept in an uncured state. The preferred temperature is specifically from 100 to 150° C. It is preferred to set the water content by percentage in the filler-containing rubber-latex-solidified product after the drying to 1.5% or less.

In the rubber wet master batch yielded after the step (III-(c)), ammonium salts hardly remain. Specifically, the amount of the ammonium salts in the rubber wet master batch is decreased into 0.4% or less by mass, preferably into 0.2% or less by mass, more preferably into 0.1% or less by mass. Accordingly, the uncured rubber composition containing this rubber wet master batch is useful as a raw material of a pneumatic tire, for which bondability, exothermic property and reinforcing performance are required, in particular, a raw material of a topping rubber for a steel tire.

One or more blending agents used ordinarily in the rubber industry may be optionally incorporated into the rubber wet master batch yielded after the step (III-(c)), thereby producing the uncured rubber composition according to the present invention. Examples of the blending agent(s) include a sulfur-based curing agent, a curing accelerator, silica, a silane coupling agent, zinc oxide, stearic acid, a curing acceleration aid, a curing retarder, an organic peroxide, an anti-ageing agent, a softening agent such as wax or oil, and a processing aid. Usable examples of the sulfur-based curing agent, the curing accelerator and anti-ageing agent, the blend amount of each of the agents, and other matters related to the agents are the same as in the first producing process.

The method for blending the above-mentioned individual components with each other is not particularly limited, and may be any one selected from a method of kneading, in advance, the blending components other than the curing type components (such as the sulfur-based curing agent and the curing accelerator) to prepare a master batch, adding the other components thereto, and further kneading the resultant mixture; a method of adding the individual components to a mixing machine in any order, and kneading the mixture; a method of adding all the components thereto at the same time, and kneading the mixture; and other methods. After the step (III-(c)), the step (IV) in the first producing process may be performed as the need arises.

EXAMPLES

Hereinafter, examples of the first to third producing processes of the present invention will be more specifically described.
(A) The First Producing Process
 Used Materials:
a) fillers:
 carbon black "N330"; "SEAST 3" (manufactured by Tokai Carbon Co., Ltd.),
b) dispersing solvent: water,
c) rubber latex liquid:
 natural rubber concentrated latex liquid manufactured by Golden Hope Co., Ltd. (DRC (dry rubber content)=30.5%) being diluted to adjust DRC to 25%, d) solidifying agent: formic acid (first class 85%, a 10% solution thereof is diluted to adjust the pH to 1.2) manufactured by Nacalai Tesque, Inc.,
e) dry rubber
natural rubber: RSS#3
f) zinc oxide: #3 zinc flower,
g) stearic acid: stearic acid for industries,
h) wax: microcrystalline wax,
i) anti-aging agents:
  (A) aromatic amine based anti-aging agent: N-(1,3-dimethylbutyl)-N'-phenyl-p-phenylenediamine ("ANTAGE 6C" manufactured by Kawaguchi Chemical Industry Co., Ltd.), and
  (B) 2,2,4-trimethyl-1,2-dihydroquinoline polymer ("NONFLEX RD, manufactured by Seiko Chemical Co., Ltd.),
j) sulfur: 5% oil-treated sulfur, and
k) curing accelerator:
  (A) N-cyclohexyl-2-benzothiazole sulfenamide "SANCELER CM" manufactured by Sanshin Chemical Industry Co., Ltd., and
  (B) 1,3-diphenylguanidine "NOCCELER D" manufactured by Ouchi-Shinko Chemical Industrial Co., Ltd.

Example 1

To a diluted latex liquid having a concentration adjusted to 0.5% by mass was added carbon black to give a blend amount described in Table 1. The carbon black was dispersed into this liquid by use of a device, ROBOMIX, manufactured by PRI-MIX Co. (condition: a rotation number of 9000 rpm) for 30 minutes, so as to prepare a slurry B described in Table 1, which contained natural-rubber-particle-adhering carbon black (step (I)). The D90 of the slurry B prepared in the step (I) was 45 and the amount of any solid (rubber) in the rubber latex liquid in the step (I) was 1% by mass of the carbon black.

Next, to the slurry B prepared in the step (I), which contained the natural-rubber-particle-adhering carbon black, was added the remaining natural rubber latex liquid (the solid (rubber) concentration thereof was adjusted to 25% by mass by the addition of water) together with the natural rubber latex liquid used in the step (I), so as to set the solid (rubber) amount to 90 parts by mass. Next, a home mixer, model SM-L56, manufactured by Sanyo Electric Co., Ltd. (condition: a rotation number of 11300 rpm) was used for 30 minutes to mix the individual components, thereby producing a natural rubber latex liquid containing the natural-rubber-latex-particle-adhering carbon black (step (II)).

Three parts by mass of formic acid were added, as a solidifying agent, to the natural rubber latex liquid produced in the step (II), which contained the natural-rubber-latex-particle-adhering carbon black, and then a screw press, model V-01, manufactured by Suchiro EPM Corp. was used to dry the solidified product into a water content by percentage of 1.5% or less. In this way, a natural rubber wet master batch was produced (step (III-(a))).

A Banbury mixer was used to dry-mix 90 parts by mass of the resultant natural rubber wet master batch, 10 parts by mass of a dry rubber (natural rubber), and carbon black and various additives described in Table 2, thereby producing a rubber composition according to Example 1 (step (IV)).

Example 2

To a diluted latex liquid having a concentration adjusted to 2.5% by mass was added carbon black to give a blend amount described in Table 1. The carbon black was dispersed into this liquid by use of a device, ROBOMIX, manufactured by PRI-MIX Co. (condition: a rotation number of 9000 rpm) for 30 minutes, so as to prepare a slurry C described in Table 1, which contained natural-rubber-particle-adhering carbon black (step (I)). The D90 of the slurry C prepared in the step (I) was 79 µm, and the amount of any solid (rubber) in the rubber latex liquid in the step (I) was 5% by mass of the carbon black.

A rubber composition was produced in the same way as in Example 1 except that the slurry C containing the natural-rubber-particle-adhering carbon black was used and the blend amounts of the resultant natural rubber wet master batch and the dry rubber (natural rubber) were changed to amounts described in Table 2 (steps (II) to (IV)).

Comparative Examples 1 and 2

In Comparative Example 1, instead of the natural rubber wet master batch, only the dry rubber was used to produce a rubber composition. In Comparative Example 2, a rubber composition was produced by use of a natural rubber wet master batch made from a carbon-black-containing natural rubber latex liquid produced by the following instead of the matter that in the steps (I) and (II) at least one portion of the natural rubber latex liquid was beforehand mixed with the dispersing solvent and then carbon black was added thereto: a slurry wherein the carbon black was beforehand dispersed in water was prepared, and then to this liquid was added the total amount of the natural rubber latex.

Evaluations:

Evaluations are made of a rubber obtained by curing each rubber composition by heating the composition at 150° C. for 30 minutes in a predetermined mold.

Exothermic Property of Cured Rubbers:

In accordance with JIS L 6265, the exothermic property of each of the produced cured rubbers is evaluated on the basis of the loss tangent tan δ thereof. The tan δ is measured by use of a rheospectrometer E4000 manufactured by UBM Co. at a frequency of 50 Hz, a temperature of 80° C. and a dynamic strain of 2%. The measured value is represented by an index.

TABLE 1

| Species of slurry containing natural-rubber-latex-particle-adhering carbon black | Carbon black species | Carbon black amount (relative to 100 parts by mass of rubber) | Solid (rubber) concentration in rubber latex liquid in step (I) (%) | Amount of any solid (rubber) in rubber latex liquid in step (I) (the percentage of mass thereof to carbon black mass) | D90 (µm) of rubber-latex-particle-adhering filler |
|---|---|---|---|---|---|
| A | N330 | 50 | Not added | Not added | 8 |
| B | N330 | 50 | 0.5 | 1 | 45 |
| C | N330 | 50 | 2.5 | 5 | 79 |

The result is indexed by regarding the measured value of Comparative Example 2 as 100. It is meant that as the numerical value is smaller, the exothermic property is lower so as to be better.

Rubber Strength TB of Cured Rubbers:

About a sample produced from each of the rubbers by use of a JIS-#3 dumbbell, the tensile strength TB (MPa) thereof is measured in accordance with JIS K 6251. The result is indexed by regarding the measured value of the strength TB of Comparative Example 2 as 100. It is meant that as the strength TB is larger, the rubber strength is higher so as to be better.

Fatigue Resistance of Cured Rubbers:

As to each of the cured rubbers, the fatigue resistance thereof is measured and evaluated in accordance with JIS K 6260. The result is indexed by regarding the measured value of Comparative Example 1 as 100. It is meant that as the numerical value thereof is larger, the fatigue resistance is better.

TABLE 2

| | | Comparative Example 1 | Comparative Example 2 | Example 1 | Example 2 |
|---|---|---|---|---|---|
| Field latex (as rubber component) amount | | — | 100 | 90 | 80 |
| Natural rubber (dry rubber) amount | | 100 | — | 10 | 20 |
| Solidifying method | Formic acid (10%-by-mass formic acid) amount | — | 3 | 3 | 3 |
| Carbon black | N330 (filler amount in final blended product) | 50 | (50) | (50) | (50) |
| | Filler slurry species | (—) | A | B | C |
| Zinc oxide amount | | 3 | 3 | 3 | 3 |
| Stearic acid amount | | 2 | 2 | 2 | 2 |
| Wax amount | | 2 | 2 | 2 | 2 |
| Anti-ageing agent amount | (A) | 2 | 2 | 2 | 2 |
| | (B) | 1 | 1 | 1 | 1 |
| Sulfur amount | | 2 | 2 | 2 | 2 |
| curing accelerator amount | (A) | 1.5 | 1.5 | 1.5 | 1.5 |
| | (B) | 0.5 | 0.5 | 0.5 | 0.5 |
| D90 (μm) of (rubber-latex-particle-adhering) filler | | (—) | 8 | 45 | 79 |
| Exothermic property (tanδ) | | 125 | 100 | 85 | 80 |
| Rubber strength (TB) | | 92 | 100 | 99 | 101 |
| Fatigue resistance | | 69 | 100 | 100 | 98 |

It is understood from the results in Table 2 that in Examples 1 and 2, cured rubbers better in exothermic property, durability and rubber strength, in particular, exothermic property were yielded than in Comparative Examples 1 and 2.

(B) The Second Producing Process

Used Materials:

a) fillers:

carbon black "N330"; "SEAST 3" (manufactured by Tokai Carbon Co., Ltd.), b) dispersing solvent: water, c) rubber latex liquid:

natural rubber concentrated latex liquid manufactured by Golden Hope Co., Ltd. (DRC (dry rubber content)=30.5%) being diluted to adjust DRC to 25%, d) zinc oxide: #3 zinc flower, e) stearic acid: stearic acid for industries, f) wax: microcrystalline wax, g) anti-aging agents:

(A) aromatic amine based anti-aging agent: N-(1,3-dimethylbutyl)-N'-phenyl-p-phenylenediamine ("ANTAGE 6C" manufactured by Kawaguchi Chemical Industry Co., Ltd.), and (B) 2,2,4-trimethyl-1,2-dihydroquinoline polymer ("NONFLEX RD, manufactured by Seiko Chemical Co., Ltd.), h) sulfur: 5% oil-treated sulfur, i) curing accelerator:

(A) N-cyclohexyl-2-benzothiazole sulfenamide "SANCELER CM" manufactured by Sanshin Chemical Industry Co., Ltd., and (B) 1,3-diphenylguanidine "NOCCELER D" manufactured by Ouchi-Shinko Chemical Industrial Co., Ltd.

j) Solidifying agent:

carbon-dioxide-containing water: water wherein carbon dioxide gas (manufactured by Taiyo Nippon Sanso Corp.) having a pressure of 1 atmosphere at 0° C. was dissolved in a pressure container (196-kPa-pressure resistant tank) to give a gas volume of 2.0 or 4.5.

Examples 3 and 4

In each of Examples 3 and 4, to a diluted latex liquid having a concentration adjusted to 0.5% by mass was added carbon black to give a blend amount described in Table 1. The carbon black was dispersed into this liquid by use of a device, ROBOMIX, manufactured by PRIMIX Co. (condition: a rotation number of 9000 rpm) for 30 minutes, so as to prepare a slurry B described in Table 1, which contained natural-rubber-particle-adhering carbon black (step (I)). The D90 of the slurry B prepared in the step (I) was 45 μm, and the amount of any solid (rubber) in the rubber latex liquid in the step (I) was 1% by mass of the carbon black.

Next, to the slurry B prepared in the step (I), which contained the natural-rubber-particle-adhering carbon black, was added the remaining natural rubber latex liquid (the solid (rubber) concentration thereof was adjusted to 25% by mass by the addition of water) together with the natural rubber latex liquid used in the step (I), so as to set the solid (rubber) amount to 100 parts by mass. Next, a home mixer, model SM-L56, manufactured by Sanyo Electric Co., Ltd. (condition: a rotation number of 11300 rpm) was used for 30 minutes to mix the individual components, thereby producing a carbon-black-containing natural rubber latex liquid (step (II)).

The home mixer model SM-L56 manufactured by Sanyo Electric Co., Ltd. (condition: a rotation number of 11300 rpm) was used to stir the carbon-black-containing natural rubber latex. In this state, carbon dioxide was added, as a solidifying agent, in an amount described in Table 3 to 100 parts by mass of any solid (rubber component) in the natural rubber latex. After the end of the addition, the stirring was continued for 3 minutes to produce a carbon-black-containing, rubber-latex-solidified product (step (III-(b1)).

While the latex liquid containing the carbon-black-containing, rubber-latex-solidified product yielded in the step (III-(b1)) was heated to 130° C., a screw press, model V-01, manufactured by Suchiro EPM Corp. was used to dehydrate and dry the solidified product into a water content by percentage of 1.5% or less. In this way, a natural rubber wet master batch of each of Examples 3 and 4 was produced (step (III-(b2)).

A Banbury mixer was used to dry-mix the resultant natural rubber wet master batch, and various additives in blend amounts described in Table 3, thereby producing an uncured rubber composition.

Comparative Examples 1 and 2

In Comparative Example 1, instead of the natural rubber wet master batch, only the dry rubber was used to produce a rubber composition. In Comparative Example 2, a rubber composition was produced by use of a natural rubber wet master batch made from a carbon-black-containing natural rubber latex liquid produced by the following instead of the matter that in the steps (I) and (II) at least one portion of the natural rubber latex liquid was beforehand mixed with the dispersing solvent and then carbon black was added thereto: a slurry wherein the carbon black was beforehand dispersed in water was prepared, and then to this liquid was added the total amount of the natural rubber latex.

Evaluations:

Evaluations are made of a rubber obtained by curing each rubber composition by heating the composition at 150° C. for 30 minutes in a predetermined mold.

Exothermic Property of Cured Rubbers:

In accordance with JIS L 6265, the exothermic property of each of the produced cured rubbers is evaluated on the basis of the loss tangent tan δ thereof. The tan δ is measured by use of a rheospectrometer E4000 manufactured by UBM Co. at a frequency of 50 Hz, a temperature of 80° C. and a dynamic strain of 2%. The measured value is represented by an index. The result is indexed by regarding the measured value of Comparative Example 2 as 100. It is meant that as the numerical value is smaller, the exothermic property is lower so as to be better.

Rubber Strength TB of Cured Rubbers:

About a sample produced from each of the rubbers by use of a JIS-#3 dumbbell, the tensile strength TB (MPa) thereof is measured in accordance with JIS K 6251. The result is indexed by regarding the measured value of the strength TB of Comparative Example 2 as 100. It is meant that as the strength TB is larger, the rubber strength is higher so as to be better.

Fatigue Resistance of Cured Rubbers:

As to each of the cured rubbers, the fatigue resistance thereof is measured and evaluated in accordance with JIS K 6260. The result is indexed by regarding the measured value of Comparative Example 1 as 100. It is meant that as the numerical value thereof is larger, the fatigue resistance is better.

TABLE 3

| | | Comparative Example 1 | Comparative Example 2 | Example 3 | Example 4 |
|---|---|---|---|---|---|
| Field latex (as rubber component) amount | | — | 100 | 100 | 100 |
| Natural rubber (dry rubber) amount | | 100 | — | — | — |
| Solidifying method | Formic acid (10%-by-mass formic acid) amount | — | 3 | — | — |
| | 2 CO$_2$GV | — | — | 1 | — |
| | 4.5 CO$_2$GV | — | — | — | 0.5 |
| Carbon black | N330 (filler amount in final blended product) | 50 | (50) | (50) | (50) |
| | Filler slurry species | (—) | A | B | B |
| Zinc oxide amount | | 3 | 3 | 3 | 3 |
| Stearic acid amount | | 2 | 2 | 2 | 2 |
| Wax amount | | 2 | 2 | 2 | 2 |
| Anti-ageing agent amount | (A) | 2 | 2 | 2 | 2 |
| | (B) | 1 | 1 | 1 | 1 |
| Sulfur amount | | 2 | 2 | 2 | 2 |
| curing accelerator amount | (A) | 1.5 | 1.5 | 1.5 | 1.5 |
| | (B) | 0.5 | 0.5 | 0.5 | 0.5 |
| D90 (μm) of (rubber-latex-particle-adhering) filler | | (—) | 8 | 45 | 45 |
| Exothermic property (tan δ) | | 125 | 100 | 88 | 86 |
| Rubber strength (TB) | | 92 | 100 | 106 | 110 |
| Fatigue resistance | | 69 | 100 | 105 | 103 |

It is understood from the results in Table 3 that in Examples 3 and 4, cured rubbers better in exothermic property, durability and rubber strength were yielded than in Comparative Examples 1 and 2.

(C) The Third Producing Process

Used Materials:

a) fillers:
 carbon black "N330"; "SEAST 3" (manufactured by Tokai Carbon Co., Ltd.),
b) dispersing solvent: water,
c) rubber latex liquid:
 natural rubber concentrated latex liquid manufactured by Golden Hope Co., Ltd. (DRC (dry rubber content)=30.5%) being diluted to adjust DRC to 25%,
d) zinc oxide: #3 zinc flower,
e) stearic acid: stearic acid for industries,
f) wax: microcrystalline wax,
g) anti-aging agents:
 (A) aromatic amine based anti-aging agent: N-(1,3-dimethylbutyl)-N'-phenyl-p-phenylenediamine ("ANTAGE 6C" manufactured by Kawaguchi Chemical Industry Co., Ltd.), and
 (B) 2,2,4-trimethyl-1,2-dihydroquinoline polymer ("NONFLEX RD, manufactured by Seiko Chemical Co., Ltd.),
h) sulfur: 5% oil-treated sulfur,
i) curing accelerator:
 (A) N-cyclohexyl-2-benzothiazole sulfenamide "SANCELER CM" manufactured by Sanshin Chemical Industry Co., Ltd., and
 (B) 1,3-diphenylguanidine "NOCCELER D" manufactured by Ouchi-Shinko Chemical Industrial Co., Ltd.
j) Gas constituting fine bubbles:
 atmospheric gas (air)
 carbon dioxide gas (manufactured by Taiyo Nippon Sanso Corp.)

Example 5

To a diluted latex liquid having a concentration adjusted to 0.5% by mass was added carbon black to give one of the blend amounts described in Table 1. The carbon black was dispersed into this liquid by use of a device, ROBOMIX, manufactured by PRIMIX Co. (condition: a rotation number of 9000 rpm) for 30 minutes, so as to prepare a slurry that was identical with the slurry B described in Table 1, which contained natural-rubber-particle-adhering carbon black (step (I)). The D90 of the slurry B prepared in the step (I) was 45 and the amount of any solid (rubber) in the rubber latex liquid in the step (I) was 1% by mass of the carbon black.

Next, to the slurry B prepared in the step (I), which contained the natural-rubber-particle-adhering carbon black, was added the remaining natural rubber latex liquid (the solid (rubber) concentration thereof was adjusted to 25% by mass by the addition of water) together with the natural rubber latex liquid used in the step (I), so as to set the solid (rubber) amount to 100 parts by mass. Next, a home mixer, model SM-L56, manufactured by Sanyo Electric Co., Ltd. (condition: a rotation number of 11300 rpm) was used for 30 minutes to mix the individual components, thereby producing a carbon-black-containing natural rubber latex liquid (step (II)).

After the latex liquid was stirred in the step (II), the latex liquid was circulated through a micro-bubble generator, model MGB20ND07Z-1HH000, manufactured by Nikuni Corp. while fine bubbles were generated therein (added thereto), thereby solidifying the carbon-black-containing natural rubber latex (step (III-(c))). Atmospheric gas (air) was used as the gas constituting the fine bubbles. Any fine bubble amount in Table 4 denotes the addition amount (L) of the fine bubbled per liter of the concerned latex.

While the latex liquid containing the carbon-black-containing natural-rubber-latex-solidified product yielded in the solidifying step was heated to 130° C., a screw press, model V-01, manufactured by Suehiro EPM Corp. was used to dehydrate and dry the latex liquid into a water content by percentage of 1.5% or less. In this way, a natural rubber wet master batch was produced.

A Banbury mixer was used to dry-mix the resultant natural rubber wet master batch and various additives in blend amounts described in Table 4, thereby producing an uncured rubber composition according to Example 5.

Examples 6 and 7

In each of Examples 6 and 7, to a diluted latex liquid having a concentration adjusted to 2.5% by mass was added carbon black to give one of the blend amounts described in Table 1. The carbon black was dispersed into this liquid by use of a device, ROBOMIX, manufactured by PRIMIX Co. (condition: a rotation number of 9000 rpm) for 30 minutes, so as to prepare a slurry that was identical with the slurry C, which contained natural-rubber-latex-particle-adhering carbon black (step (I)). The D90 of the slurry C prepared in the step (I) was 79 µm, and the amount of any solid (rubber) in the rubber latex liquid in the step (I) was 5% by mass of the carbon black.

A rubber composition according to Example 6 was produced in the same way as in Example 5 except that the slurry C was used and the average bubble diameter and the average number of the atmospheric gas bubbles were changed to values described in Table 4 (steps (II) to (IV)). Moreover, a rubber composition according to Example 7 was produced in the same way as in Example 5 except that the slurry C was used and carbon dioxide gas was used instead of the atmospheric gas (steps (II) to (IV)).

Comparative Examples 1 and 2

In Comparative Example 1, instead of the natural rubber wet master batch, only the dry rubber was used to produce a rubber composition. In Comparative Example 2, a rubber composition was produced by use of a natural rubber wet master batch made from a carbon-black-containing natural rubber latex liquid produced by the following instead of the matter that in the steps (I) and (II) at least one portion of the natural rubber latex liquid was beforehand mixed with the dispersing solvent and then carbon black was added thereto: a slurry wherein the carbon black was beforehand dispersed in water was prepared, and then to this liquid was added the total amount of the natural rubber latex.

Evaluations:

Evaluations are made of a rubber obtained by curing each rubber composition by heating the composition at 150° C. for 30 minutes in a predetermined mold.

Exothermic Property of Cured Rubbers:

In accordance with JIS L 6265, the exothermic property of each of the produced cured rubbers is evaluated on the basis of the loss tangent tan δ thereof. The tan δ is measured by use of a rheospectrometer E4000 manufactured by UBM Co. at a frequency of 50 Hz, a temperature of 80° C. and a dynamic strain of 2%. The measured value is represented by an index. The result is indexed by regarding the measured value of Comparative Example 2 as 100. It is meant that as the numerical value is smaller, the exothermic property is lower so as to be better.

Rubber Strength TB of Cured Rubbers:

About a sample produced from each of the rubbers by use of a JIS-#3 dumbbell, the tensile strength TB (MPa) thereof is measured in accordance with JIS K 6251. The result is indexed by regarding the measured value of the strength TB of Comparative Example 2 as 100. It is meant that as the strength TB is larger, the rubber strength is higher so as to be better.

Fatigue Resistance of Cured Rubbers:

As to each of the cured rubbers, the fatigue resistance thereof is measured and evaluated in accordance with JIS K 6260. The result is indexed by regarding the measured value of Comparative Example 1 as 100. It is meant that as the numerical value thereof is larger, the fatigue resistance is better.

TABLE 4

|  |  | Comparative Example 1 | Comparative Example 2 | Example 5 | Example 6 | Example 7 |
|---|---|---|---|---|---|---|
| Field latex (as rubber component) amount | | — | 100 | 100 | 100 | 100 |
| Natural rubber (dry rubber) amount | | 100 | — | — | — | — |
| Solidifying method | Formic acid (10%-by-mass formic acid) amount | — | 3 | — | — | — |

TABLE 4-continued

|  |  | Comparative Example 1 | Comparative Example 2 | Example 5 | Example 6 | Example 7 |
|---|---|---|---|---|---|---|
|  | Atmospheric gas fine bubble amount (L/liter of latex) | — | — | 15 | 15 | — |
|  | Carbon dioxide gas amount | — | — | — | — | 10 |
|  | Average bubble diameter (μm) | (—) | (—) | (100) | (50) | (50) |
|  | Average number (× 10000/mL) | (—) | (—) | (10) | (1000) | (50) |
| Carbon black | N330 (filler amount in final blended product) | 50 | (50) | (50) | (50) | (50) |
|  | Filler slurry species | (—) | A | B | C | C |
| Zinc oxide amount |  | 3 | 3 | 3 | 3 | 3 |
| Stearic acid amount |  | 2 | 2 | 2 | 2 | 2 |
| Wax amount |  | 2 | 2 | 2 | 2 | 2 |
| Anti-ageing agent amount | (A) | 2 | 2 | 2 | 2 | 2 |
|  | (B) | 1 | 1 | 1 | 1 | 1 |
| Sulfur amount |  | 2 | 2 | 2 | 2 | 2 |
| Curing accelerator amount | (A) | 1.5 | 1.5 | 1.5 | 1.5 | 1.5 |
|  | (B) | 0.5 | 0.5 | 0.5 | 0.5 | 0.5 |
| D90 (μm) of (rubber-latex-particle-adhering) filler |  | (—) | 8 | 45 | 79 | 79 |
| Exothermic property (tanδ) |  | 125 | 100 | 88 | 81 | 80 |
| Rubber strength (TB) |  | 92 | 100 | 105 | 103 | 105 |
| Fatigue resistance |  | 69 | 100 | 104 | 107 | 105 |

It is understood from the results in Table 4 that in Examples 5 to 7, cured rubbers better in exothermic property, durability and rubber strength were yielded than in Comparative Examples 1 and 2.

What is claimed is:

1. A process for producing an uncured rubber composition containing a rubber wet master batch obtained by using, as raw materials, at least a filler, a dispersing solvent, and a rubber latex liquid made mainly of a natural rubber latex, comprising:
   a step (I) wherein at the time of dispersing the filler into the dispersing solvent, at least one portion of the rubber latex liquid is added thereto, thereby preparing a slurry containing the filler to which rubber latex particles adhere,
   a step (II) wherein the slurry is mixed with the rest of the rubber latex liquid, thereby preparing the rubber latex liquid containing the rubber-latex-particle-adhering filler,
   a step (III-a) wherein the rubber latex liquid containing the rubber-latex-particle-adhering filler is solidified and dried, thereby producing a rubber wet master batch, and
   a step (IV) wherein the rubber wet master batch is dry-mixed with a dry rubber made mainly of a natural rubber and/or a polyisoprene rubber.

2. The uncured rubber composition producing process according to claim 1, wherein in the step (I), the 90% volume particle diameter (D90) of the rubber-latex-particle-adhering filler in the slurry is 31 μm or more.

3. The uncured rubber composition producing process according to claim 1, wherein in the step (I), the ratio by mass of any solid (rubber) in the added rubber latex liquid is from 0.25 to 15% by mass of the filler.

4. The uncured rubber composition producing process according to claim 1, wherein in the step (I), a concentration of the solid (rubber) in the added rubber latex liquid is from 0.2 to 5% by mass.

5. The uncured rubber composition producing process according to claim 1, wherein in the step (IV), the ratio of A/B is from 90/10 to 70/30 wherein A represents the total amount of any rubber component in the rubber wet master batch and B represents the total amount of any rubber component in the dry rubber.

6. The uncured rubber composition producing process according to claim 1, wherein when the total amount of any rubber component in the uncured rubber composition in the step (IV) is regarded as 100 parts by mass, carbon black is further contained in an amount of 0 to 5 parts by mass.

7. A process for producing an uncured rubber composition containing a rubber wet master batch obtained by using, as raw materials, at least a filler, a dispersing solvent, and a rubber latex liquid made mainly of a natural rubber latex, comprising:
   a step (I) wherein at the time of dispersing the filler into the dispersing solvent, at least one portion of the rubber latex liquid is added thereto, thereby preparing a slurry containing the filler to which rubber latex particles adhere,
   a step (II) wherein the slurry is mixed with the rest of the rubber latex liquid, thereby preparing the rubber latex liquid containing the rubber-latex-particle-adhering filler,
   a step (III-(b1)) wherein carbon dioxide is used as a solidifying agent to solidify the rubber latex containing the rubber-latex-particle-adhering filler, thereby producing a filler-containing rubber-latex-solidified product, and
   a step (III-(b2)) wherein the filler-containing rubber-latex-solidified product is solidified and dried, thereby removing any ammonium salt contained in the filler-containing rubber-latex-solidified product, so as to produce the rubber wet master batch.

8. The uncured rubber composition producing process according to claim 7, wherein in the step (I), the 90% volume particle diameter (D90) of the rubber-latex-particle-adhering filler in the slurry is 31 μm or more.

9. The uncured rubber composition producing process according to claim 7, wherein in the step (I), the amount of any solid (rubber) in the added rubber latex liquid is from 0.25 to 15% by mass of the filler.

10. The uncured rubber composition producing process according to claim 7, wherein in the step (I), a concentration of the solid (rubber) in the added rubber latex liquid is from 0.2 to 5% by mass.

11. The uncured rubber composition producing process according to claim 7, wherein as the solidifying agent, the following is used: at least one selected from the group consisting of carbon dioxide gas, carbon-dioxide-containing water, and dry ice.

12. A process for producing an uncured rubber composition containing a rubber wet master batch obtained by using, as raw materials, at least a filler, a dispersing solvent, and a rubber latex liquid made mainly of a natural rubber latex, comprising:
a step (I) wherein at the time of dispersing the filler into the dispersing solvent, at least one portion of the rubber latex liquid is added thereto, thereby preparing a slurry containing the filler to which rubber latex particles adhere,
a step (II) wherein the slurry is mixed with the rest of the rubber latex liquid, thereby preparing the rubber latex liquid containing the rubber-latex-particle-adhering filler, and
a step (III-(c)) wherein fine bubbles are added to the rubber latex liquid containing the rubber-latex-particle-adhering filler to remove ammonia contained in the rubber latex liquid containing the rubber-latex-particle-adhering filler, thereby solidifying and drying the rubber latex liquid containing the rubber-latex-particle-adhering filler to produce the rubber wet master batch.

13. The uncured rubber composition producing process according to claim 12, wherein in the step (I), the 90% volume particle diameter (D90) of the rubber-latex-particle-adhering filler in the slurry is 31 μm or more.

14. The uncured rubber composition producing process according to claim 12, wherein in the step (I), the amount of any solid (rubber) in the added rubber latex liquid is from 0.25 to 15% by mass of the filler.

15. The uncured rubber composition producing process according to claim 12, wherein in the step (I), a concentration of the solid (rubber) in the added rubber latex liquid is from 0.2 to 5% by mass.

16. The uncured rubber composition producing process according to claim 12, wherein the average bubble diameter of the fine bubbles is 100 μm or less.

17. The uncured rubber composition producing process according to claim 12, wherein the average number of the fine bubbles is 50000 per milliliter or more.

18. The uncured rubber composition producing process according to claim 12, wherein the fine bubbles are fine bubbles comprising a gas made mainly of air or carbon dioxide.

19. The uncured rubber composition producing process according to claim 1, wherein the step (I) is a step wherein the portion of the rubber latex liquid is beforehand mixed with the dispersing solvent, and subsequently the filler is added to the mixture to disperse the filler therein, thereby preparing the slurry containing the rubber-latex-particle-adhering filler.

20. The uncured rubber composition producing process according to claim 1, wherein the rubber wet master batch obtained after the step (III-(a)) contains the filler in an amount of 40 to 80 parts by mass for 100 parts by mass of the rubber.

21. The uncured rubber composition producing process according to claim 1, wherein the filler is carbon black.

22. The uncured rubber composition producing process according to claim 1, wherein the rubber latex liquid is a natural rubber latex liquid.

23. An uncured rubber composition produced by a producing process as recited in claim 1.

24. The uncured rubber composition according to claim 23, wherein the filler is contained in an amount of 40 to 80 parts by mass for 100 parts by mass of the entire rubber.

25. A pneumatic tire, which is obtained by use of an uncured rubber composition as recited in claim 23.

26. The pneumatic tire according to claim 25, which is obtained by use of an uncured rubber composition as recited in claim 23 for a topping rubber for steel cord covering, and/or tread rubber.

27. The uncured rubber composition producing process according to claim 7, wherein the step (I) is a step wherein the portion of the rubber latex liquid is beforehand mixed with the dispersing solvent, and subsequently the filler is added to the mixture to disperse the filler therein, thereby preparing the slurry containing the rubber-latex-particle-adhering filler.

28. The uncured rubber composition producing process according to claim 7, wherein the rubber wet master batch obtained after the step (III-(b)) contains the filler in an amount of 40 to 80 parts by mass for 100 parts by mass of the rubber.

29. The uncured rubber composition producing process according to claim 7, wherein the filler is carbon black.

30. The uncured rubber composition producing process according to claim 7, wherein the rubber latex liquid is a natural rubber latex liquid.

31. An uncured rubber composition produced by a producing process as recited in claim 7.

32. The uncured rubber composition according to claim 31, wherein the filler is contained in an amount of 40 to 80 parts by mass for 100 parts by mass of the entire rubber.

33. A pneumatic tire, which is obtained by use of an uncured rubber composition as recited in claim 31.

34. The pneumatic tire according to claim 33, which is obtained by use of an uncured rubber composition as recited in claim 31 for a topping rubber for steel cord covering, and/or tread rubber.

35. The uncured rubber composition producing process according to claim 12, wherein the step (I) is a step wherein the portion of the rubber latex liquid is beforehand mixed with the dispersing solvent, and subsequently the filler is added to the mixture to disperse the filler therein, thereby preparing the slurry containing the rubber-latex-particle-adhering filler.

36. The uncured rubber composition producing process according to claim 12, wherein the rubber wet master batch obtained after the step (III-(c)) contains the filler in an amount of 40 to 80 parts by mass for 100 parts by mass of the rubber.

37. The uncured rubber composition producing process according to claim 12, wherein the filler is carbon black.

38. The uncured rubber composition producing process according to claim 12, wherein the rubber latex liquid is a natural rubber latex liquid.

39. An uncured rubber composition produced by a producing process as recited in claim 12.

40. The uncured rubber composition according to claim 39, wherein the filler is contained in an amount of 40 to 80 parts by mass for 100 parts by mass of the entire rubber.

41. A pneumatic tire, which is obtained by use of an uncured rubber composition as recited in claim 39.

42. The pneumatic tire according to claim 41, which is obtained by use of an uncured rubber composition as recited in claim 39 for a topping rubber for steel cord covering, and/or tread rubber.

* * * * *